US007936397B2

(12) United States Patent
Tung et al.

(10) Patent No.: US 7,936,397 B2
(45) Date of Patent: May 3, 2011

(54) METHOD AND PROCESS FOR ELECTRONICALLY POSTING BULLETIN BOARD MESSAGES

(75) Inventors: Alex Tung, Storrs Mansfield, CT (US); Ashish Kapoor, Plano, TX (US)

(73) Assignee: Anuncio Media, LLC, Storrs, CT (US)

(*) Notice: Subject to any disclaimer, the term of this patent is extended or adjusted under 35 U.S.C. 154(b) by 970 days.

(21) Appl. No.: 11/307,430

(22) Filed: Feb. 7, 2006

(65) Prior Publication Data

US 2007/0253350 A1 Nov. 1, 2007

(51) Int. Cl.
*H04N 5/66* (2006.01)

(52) U.S. Cl. ....................... 348/383; 707/999.01; 705/14

(58) Field of Classification Search ..................... 707/10
See application file for complete search history.

(56) References Cited

U.S. PATENT DOCUMENTS 4,541,119 A 9/1985 Cooper et al.
5,245,429 A 9/1993 Virginio et al.
5,495,615 A 2/1996 Nizar et al.
5,555,420 A 9/1996 Sarangdhar et al.
5,612,741 A * 3/1997 Loban et al. .................. 348/383
6,269,173 B1 7/2001 Hsien
6,898,626 B2 5/2005 Ohashi
2005/0021521 A1 1/2005 Wycoff
2005/0022134 A1 * 1/2005 Tokashiki ..................... 715/764
2006/0149495 A1 * 7/2006 Mazalek et al. .............. 702/150
2007/0052636 A1 * 3/2007 Kalt et al. ....................... 345/83
2009/0101706 A1 * 4/2009 Boyd ............................ 235/380

* cited by examiner

*Primary Examiner* — Creighton Smith

(74) *Attorney, Agent, or Firm* — Michael L. Greenberg, Esq.; Greenberg & Lieberman, LLC

(57) ABSTRACT

A method of electronically broadcasting messages to a general or targeted audience. A message sender can post messages on electronic bulletin boards by accessing a website or calling a phone number. The user has control of the design and content of the message including font, background, pictures and sound; there is no need to contact another person or organization such as a radio or TV station to post the message; and the user can target a specific audience if so desired. Messages are posted on user-specified electronic bulletin boards for a certain time slot and can be applied to a variety of services such as highway advertising boards, Amber Alerts, and campus message boards, to name a few.

5 Claims, 1 Drawing Sheet

METHOD AND PROCESS FOR ELECTRONICALLY POSTING BULLETIN BOARD MESSAGES

FIELD OF THE INVENTION

The present invention is related to broadcasting various messages on electronic bulletin boards via World Wide Web and/or phones to serve general or targeted audience. It is a creative means for an individual or organization to electronically broadcast messages.

BACKGROUND OF THE INVENTION

There are numerous ways of broadcasting messages with today's technology. Traditional means such as television, newspaper, radio, phones, as well as more technologically advanced means such as emails, websites, and instant messages. Some of these are one-way communication, meaning the information is dispersed without the recipient responding to the messages (television, newspaper, etc), while other are bi-directional (phones, emails, text messages and instant messages). Some are intended for a specific audience while others are broadcast to the general public. Existing means of broadcasting information is inefficient and expensive for the message sender; the methods are also not conducive for an average person to be able to broadcast a message. A prime example is using media such as TV, radio, newspaper, or magazine to broadcast a message—it takes significant amount of time and money and often involves several parties to place a message and broadcast information, even for a simple message. An additional drawback is that the message sender often has little control on the appearance of the message.

Other forms of messaging systems also exist. For example, when driving on highways, current traffic conditions can be displayed on an overhead board or by the side of the road to alert the drivers of accidents, roadwork or closed exits ahead. However, these differ greatly from the present invention because they are mainly controlled and operated by centralized personnel (namely highway patrol police) through a certain control system. In other words, these electronic road signs are not for the average message or average user but relate specifically and only to matters concerning the road and driving conditions.

Relevant art includes: European Publication 0347354 filed Jun. 14, 1989 by Renault et al. is a diffusion of messages for driving conditions. Unlike the present invention this patent is intended for a highway system and would therefore not complete the objectives of the present invention. European Patent 047508 issued to Quan on Aug. 8, 1991 is a distributed messaging system and method. The invention relates more to computer-based message passing systems that provide interprocess communication for different applications, thus cannot be used to post messages to electronic bulletin board systems.

European Publication 0491068 filed Dec. 12, 1990 by Virginio et al. (U.S. Pat. No. 5,245,429 issued on Sep. 14, 1993) is a selective data broadcasting receiver adapter apparatus and method for PCs. It allows a user to receive incoming data from a TV channel or broadcasting network from the aerial antenna to their personal computer. It cannot, however, be used by the average person to post a message on an electronic bulletin board.

U.S. Pat. No. 4,541,119 issued to Cooper et al. on Sep. 19, 1985, is a portable broadcast band information transmitting system. It is essentially a portable advertising sign, which is placed in proximity to a street and includes a message board, but unlike the present invention it is not meant for use with the World Wide Web or phones.

U.S. Pat. No. 5,495,615 issued to Nizar et al. on Feb. 27, 1996 is a multiprocessor interrupt controller with remote reading of interrupt control registers. It is not intended to post messages on electronic bulletin boards. U.S. Pat. No. 5,555,420 issued to Sarangdhar et al. on Sep. 10, 1996 is a multiprocessor programmable system with separate interrupt bus and bus retry management. This invention also relates to a multiprocessor system with interrupt request messages, but unlike the present invention it is not intended for posting messages on electronic bulletin boards.

U.S. Pat. No. 6,269,173 issued to Hsien on Jul. 31, 2001 is an instant response broadcast board system and method. It is intended primarily for advertising and promotional materials in supermarkets and the like wherein the broadcast board is interactive per the user, and provides for an interactive display instead of a static message which can help the promoter or advertiser determine how effective the placement of the board is. It is not intended for use with the World Wide Web or phones and thus is entirely different from the present invention.

U.S. Pat. No. 6,898,626 issued to Ohashi on May 24, 2005 is a system and method for accessing a message board server. In order to view messages stored on the server database, a viewer must submit a read request via network to the server. In response to the read request the server finder selects one of the servers based on the position information of the read request. However, unlike the present invention it is not intended for broadcasting messages but rather works only on a read-and-write request basis.

US Publication 2005/0021521 published on Jan. 27, 2005, is a system for embedding Internet message board display links. It is intended primarily for advertisements and it designates specific permanent lines embedded within the list of messages that are used to display these listings. Unlike the present invention the user cannot design the appearance of the advertisement being placed.

Hence, there exists a need for a bulletin board message posting process that is easy to use and can be used by anyone; where the user has control over the design and appearance of the message; where the user does not have to use a "middleman" such as an advertisement agent or TV station representative to post a message; and where a user can target a general or, if required, specific audience. There exists a need for a bulletin board message posting process that can be implemented on the World Wide Web and/or phones. Since it is a commonly utilized technology, is fast, efficient and readily accessible, it can be used to design and post messages easily. It is anticipated that none of the relevant art accomplishes the goals and objectives of the present invention. There is a need for advertisements that can be viewed at a particular time, but there are no means available for someone to place an advertisement on a billboard and for them to control such an ad. There is a need for someone to be easily capable, from their network or computer device, to directly publish a message or advertisement without having to go through the traditional middleman.

SUMMARY OF THE INVENTION

The present invention is a method and process of broadcasting messages on electronic bulletin boards. However, this method is different from existing ones in the aspect that the messages are composed and distributed via different media, World Wide Wed and/or phones. The present invention allows the individual user all the way up to the corporate user to run a clip at whatever time, frequency, or location, a display screen corresponding to the present invention. The present invention allows someone from their home computer to have a 30-second advertisement run at 11:30 at night on a display screen located on the highway outside a movie theater, for example.

To use the proposed system, a user dials in via phone or uses a designated website to design messages or any type of commercial advertisement. The respective messages are displayed on user-selected electronic bulletin boards during certain time periods based on the preferences of the user.

It is an object of the present invention to allow a message sender to control the design of the message. It is an object of the present invention to be simple to use through a standard website or phone system. It is a further object of the present invention to permit the message sender to target a general or specific audience by posting on individual message board. It is an object of the present invention to allow the message sender to avoid having to contact anyone whether it is an advertisement agent, TV or radio station before broadcasting the message—it can be done directly by the message sender.

The present invention has the possibility of being applied to a variety of services, including but not limited to:

- Street advertising boards
- Business districts in metropolitan areas advertising boards
- Highway advertising boards
- Advertising during major events (NBA, NFL, Olympics, Oscars, NASCAR, etc.)
- Airport advertising boards
- Campus message boards, including secondary and higher education schools
- Municipal message boards (Apartments Rental, Things for Sale, etc.)
- Gas station advertising boards
- TV channel commercials
- Amber Alerts
- Election campaign ads, coverage, results
- Local temperature and weather.

The process and technical details are described further in the description.

DETAILED DESCRIPTION OF THE PREFERRED EMBODIMENT

Figure 1:
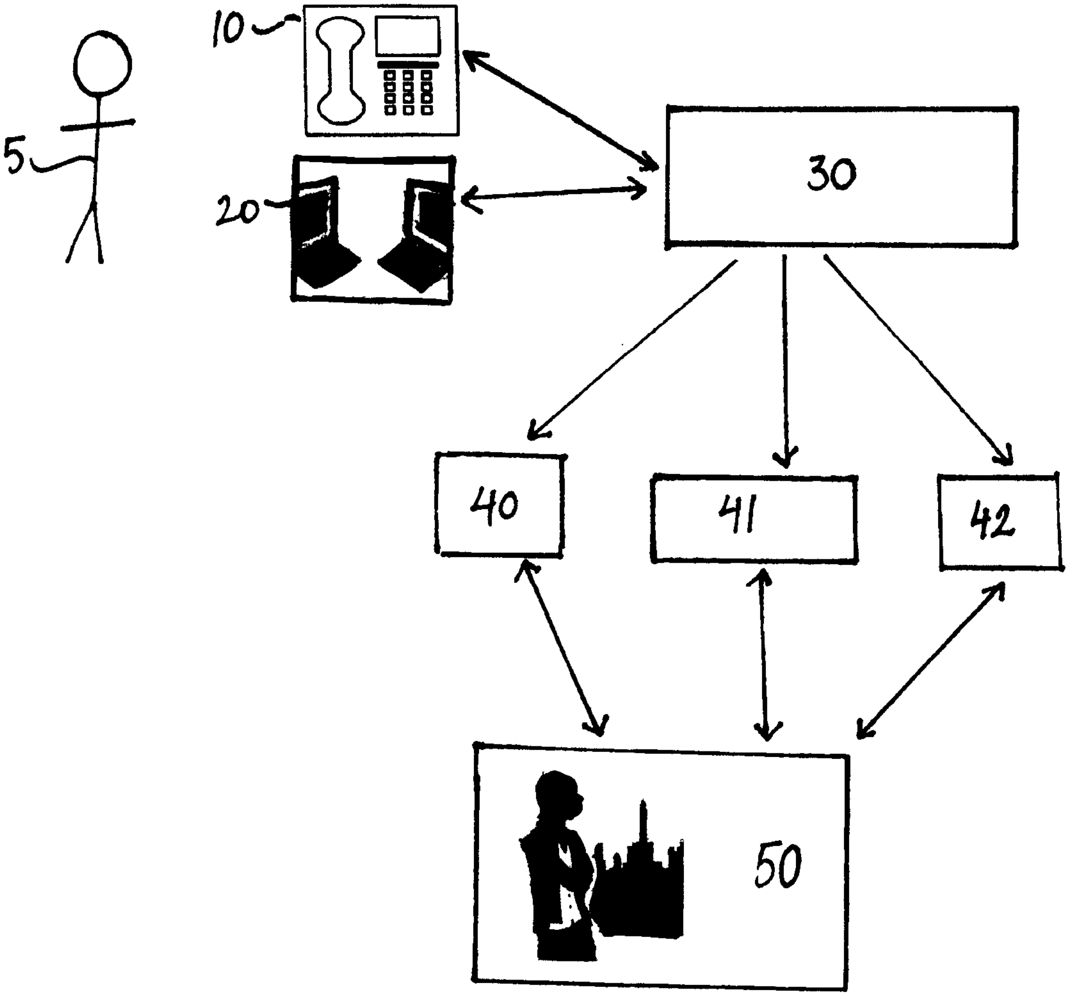
FIG. 1 is a flowchart of the present invention.

As seen in FIG. 1, the message sender (5) uses a phone (10) or World Wide Web (20) to design and post a message on the information display control system (30). The various messages (40, 41, 42, for example) are then relayed to the general public or targeted audience (50). There may be multiple targeted audiences (51 and 52), and so not all the messages may go to the same audience. The present invention is therefore an improved method and process of posting messages on electronic bulletin boards.

Additional features of the present invention include the ability of the message sender (5) to control the design of the message (40, 41, 42); it obviates the need for the message sender (5) to contact an advertisement agent, TV or radio station as the message sender (5) can perform the function on their own; and the process is easily done with a well-designed website (20) or phone system (10).

The technical process in more detail: once the message-sender (5) is connected by phone (10) or web (20), he or she will identify which message board location(s) the message (40-42) is intended for (an example would be a message sender wanting to broadcast to young adults by placing a message on a bulletin board located within a university campus). Each electronic bulletin board has a unique ID. The message-sender (5) follows simple instructions to design the message(s) (40-42) to display; chooses the period of time available for the display; chooses the form of payment; and finally chooses which special effects such as pictures, sound, video, background, font and color to be incorporated into the message (40-42). If the user chooses phone as the design tool, they will have limited design capability, guided by the menu-based automated system or the customer support personnel. If the message-sender (5) is a registered customer, and has an existing account, the system defaults to the prior information used for the method of payment, and then checks with the message-sender (5) whether he/she wants to maintain the same information or edit it for the current transaction. If the message-sender (5) is a first-time customer, the system will instruct the message-sender (5) to create an account after the transaction for future purchases. The system has a complex database, which tracks each message board's scheduled event. The message-senders (5) can see the status of all time slots, either available or taken, before deciding which time period the message (40-42) should appear. The system will be available on a 24/7 basis. A user can purchase multiple time slots at one time. The general public (50, 51, 52) can also print out any messages with a printing service that is conveniently attached to said messages.

What is claimed is:

1. A method for a message-sender to electronically broadcast a clip on at least one billboard, comprising:

a message sender accessing an information display control system via World Wide Web or phones;

a database assigning unique ID's to the at least one billboard, the unique ID's assigned per a location of the at least one billboard;

the database identifying the at least one billboard by the unique ID's to display the clip;

the message sender selecting at least one time slot for the at least one billboard to display the clip;

the database displaying the clip during the at least one time slot for the at least one billboard; and the message sender choosing a form of payment for the at least one billboard to display the clip during the at least one time slot.

2. The method of claim 1 further comprising the message sender designing the clip.

3. The method of claim 1 further comprising the message sender choosing special effects for the clip.

4. The method of claim 1 further comprising the database creating a payment account for the message-sender.

5. The method of claim 1 further comprising the message sender relaying the clip to an audience.

* * * * *